United States Patent Office 3,677,879
Patented July 18, 1972

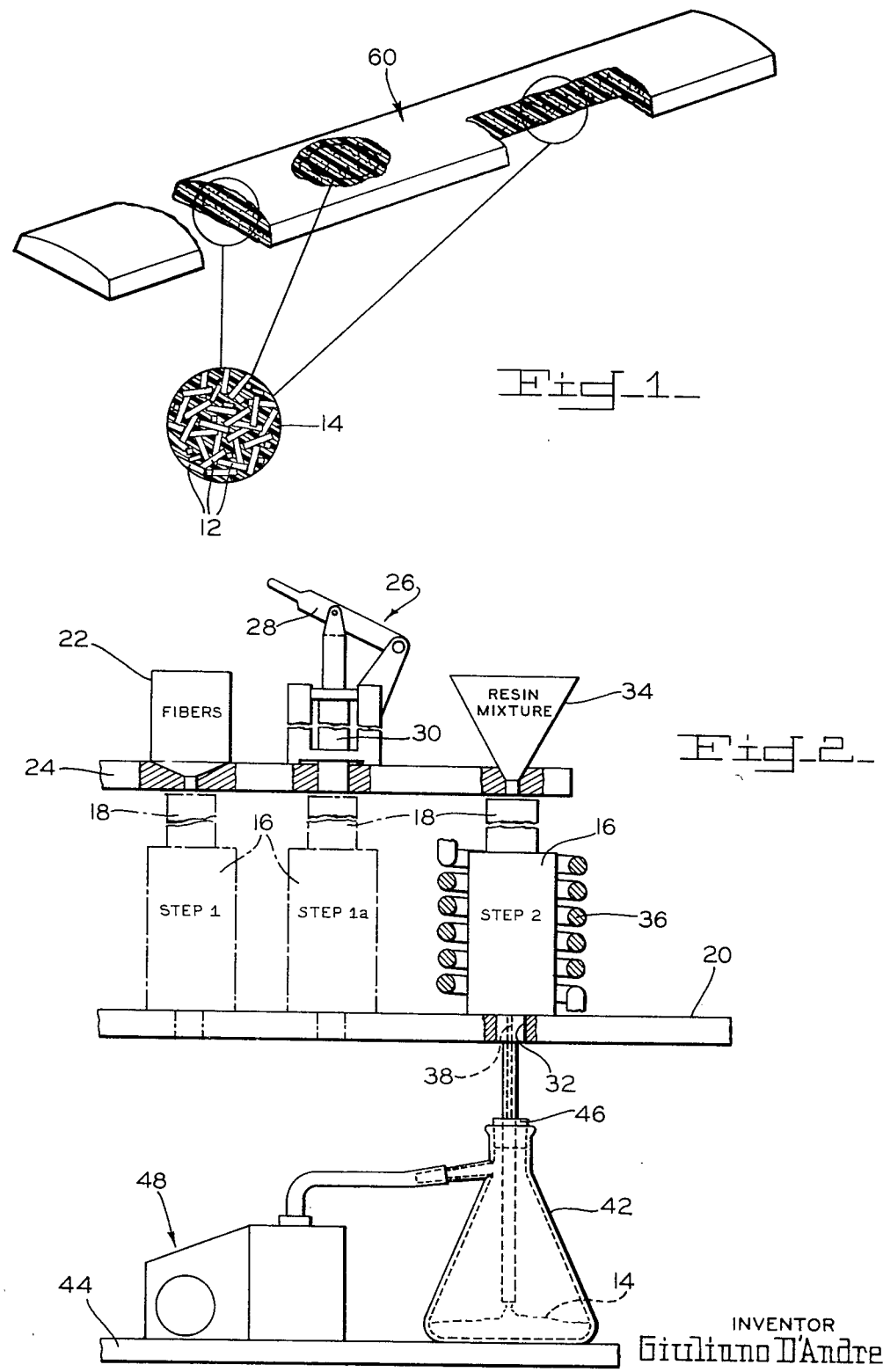

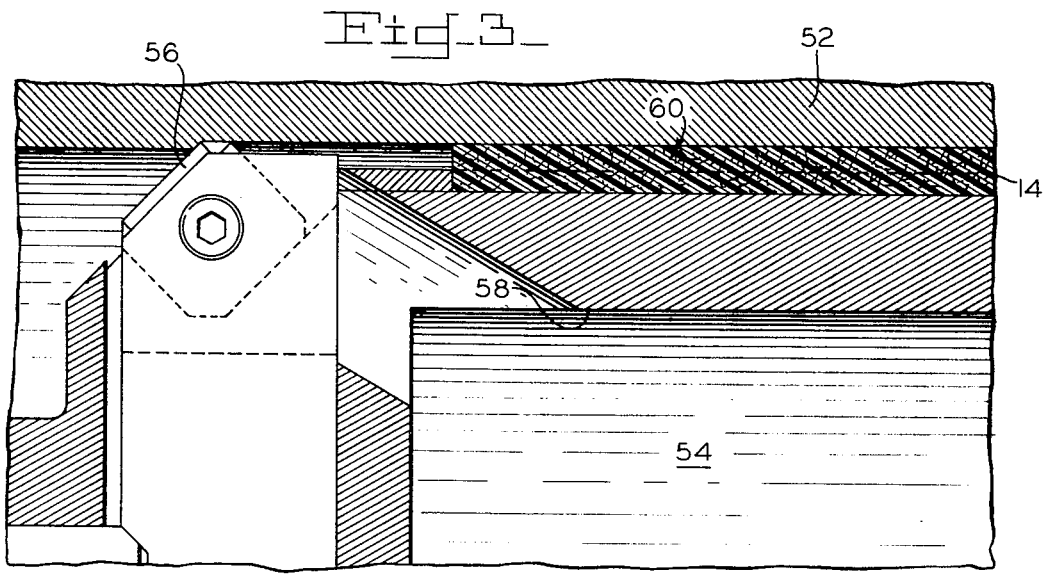
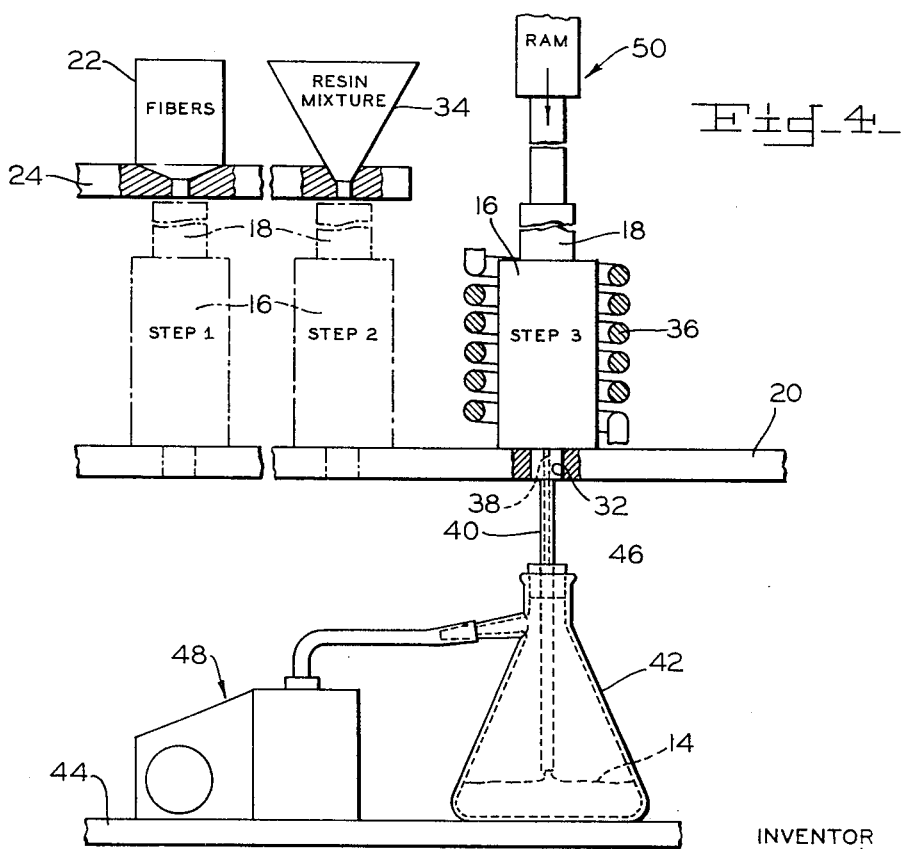

3,677,879
THERMALLY CONDUCTIVE BEARING MATERIAL
Giuliano D'Andrea, Elnora, N.Y., assignor to the United States of America as represented by the Secretary of the Army
Filed Apr. 28, 1970, Ser. No. 32,666
Int. Cl. B32b 15/20, 19/02
U.S. Cl. 161—170                    3 Claims

ABSTRACT OF THE DISCLOSURE

A light weight composite material consisting essentially of geometrically identical metal fibers uniformly distributed in a randomly oriented fashion throughout a matrix of an epoxy resin mixed with an amine curing agent has been found to be particularly useful as a material for bearings with large surface areas in frictional contact with steel surfaces. The material can be tailored to provide a predetermined thermal conductivity with isotropic or anisotropic characteristics by the proper control of such factors as the thermal conductivity of the matrix, the ratio of fiber volume to that of the matrix, and the geometry of the individual fibers.

BACKGROUND OF THE INVENTION

This invention relates to composite materials consisting essentially of metallic fibers in a non-metallic matrix and is more particularly directed to materials of this nature which possess a high degree of thermal conductivity.

It is well known that fiber reinforced composite materials can be tailored to provide highly desirable properties offering significant improvements to the fabrication and utilization of a variety of industrial products. For example, where the design requirements call for a light weight material which can be readily cast to shape and provide a relatively good combination of strength and toughness, such properties can be attained by a composite material in which glass or other high strength fibers are distributed through an epoxy resin matrix. In view of the excellent anti-frictional qualities of these non-metallic composites, some consideration has been given to the utilization thereof as a suitable material for bearings. However, bearings fabricated from these non-metallic materials have not provided satisfactory endurance life since the thermal conductivity thereof is not high enough to effectively dissipate the huge quantities of frictional heat generated by the slidable contact of relatively large surface areas.

Such is particularly the case in the machining of bores in elongated parts such as gun tubes where the boring head containing the cutters must be provided with bearing pads capable of rapidly dissipating the large quantities of heat generated at the interface with the gun tube. In addition, the bearing pad material must be light in weight, possess a relatively low coefficient of friction, and be slightly compressible in order to permit the pads to engage the bore surface of the gun tube with the relatively firm fit necessary to achieve the required support of the boring head. Other requirements of this bearing pad material are strength and toughness in compression, the ability to resist chemical attack by the cutting oils generally employed in modern high speed machining apparatus, and the ability to be economically formed to relatively intricate shapes.

Accordingly, it is an object of this invention to provide a composite material which will be as thermally conductive as steel and yet will be only one quarter thereof in density.

It is a further object of the present invention to provide a composite material, as aforesaid, which will possess a relatively low coefficient of friction and at the same time be highly resistant to wear and abrasion.

Another object of this invention is to provide a composite material, as aforesaid, which will provide outstanding endurance life in environments productive of relatively high quantities of frictional heat.

It is also an object of this invention to provide a composite material consisting of non-magnetic metallic fibers uniformly distributed through an epoxy matrix in a manner which will provide a thermal conductivity up to 50 times greater than that of the epoxy alone.

Still another object of the present invention is to provide a composite material, as aforesaid, which can be readily tailored to yield a predetermined degree of thermal conductivity.

A further object of this invention is to provide a composite material, as aforesaid, wherein the fibers are specifically oriented to provide greater thermal conductivity in one direction than in directions perpendicular thereto.

Another object of this invention is to provide a thermally conductive composite material which can be readily and inexpensively cast or molded to any desired configuration with a high degree metallurgical soundness and dimensional stability.

An additional object of the present invention is to provide a composite material for bearing use which will rapidly dissipate the frictional heat imparted thereto by slidable contact with the surrounding surfaces.

An important object of the present invention is the provision of a relatively strong, tough, thermally conductive composite material which is particularly useful for the type of bearing pads employed in the machining of bores in such elongated parts as large caliber gun tubes.

It has been found that the foregoing objects can best be attained by a composite material consisting of between 20% to 70% by volume of individually identical metallic fibers, such as aluminum or copper, uniformly distributed in random orientation throughout a thermosetting resin matrix containing an amine type curing agent. The required uniformity of distribution of the fibers in the matrix is achieved by adding a liquified resin and curing agent to the desired volume of fibers loosely packed in a closed mold and thereafter utilizing a vacuum pump to draw the resin mixture through the mold so as to completely surround the fibers prior to permitting the resin to solidify. In the event it is desired that the bearing material possess anisotropic thermal conductivity, this capability can be attained in those instances where the fibers are of copper and are in excess of 40% by volume simply by subjecting the contents of the mold to a hot pressing operation. It has been found that the application of pressure prior to the solidification of the resin mixture will cause the fibers to reorient themselves and assume a position substantially perpendicular to the direction in which the load is applied. A further increase in thermal conductivity can be attained by adding a suitable powdered metal to the resin mixture. Considerable testing has indicated that the superior thermal conductivity of the composite material of the present invention is a direct function of the degree of thermal conductivity of the martix, the ratio of the volume of the fibers to that of the matrix, and the geometry of the fibers, these functions being listed in the order of their individual significance.

BRIEF DESCRIPTION OF THE DRAWINGS

The exact nature of the invention, as well as other objects and advantages thereof, will be readily apparent from consideration of the following specification relating to the annexed drawings wherein:

FIG. 1 is a perspective view of a typical bearing pad fabricated from the fiber reinforced composite material of the present invention and is broken away in three areas to show a magnified representation of the randomly oriented fibers uniformly distributed throughout the matrix in order to provide isotropic thermal conductivity i.e., of equal extent in all directions;

FIG. 2 is a schematic view of an apparatus utilized to form the bearing pad of FIG. 1 and shows the mold in the sequence of positions required to carry out the fabrication process;

FIG. 3 is a fragmentary cross-sectional view of a boring head showing the environment in which the bearing pad is required to dissipate the heat generated during the sliding contact thereof with the interior bore surface of a gun tube;

FIG. 4 is a schematic view similar to that of FIG. 2 but showing the hot pressing step required to form the composite materials when the volme percentage of the fibers is in excess of 40%;

DESCRIPTION OF THE PREFERRED EMBODIMENTS

Figure 5:
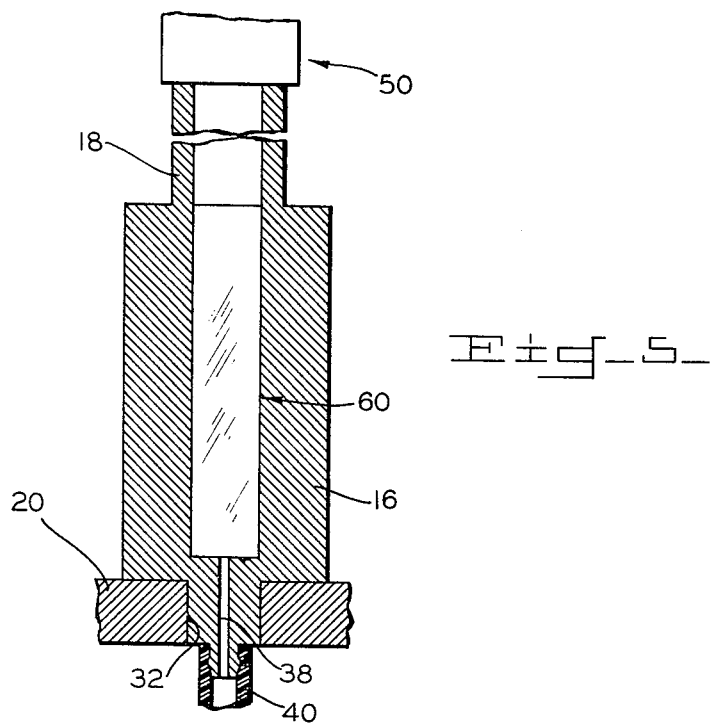
FIG. 5 is a cross-sectional view showing the apparatus utilized to hot press the contents of the mold to the desired configuration.

As shown in FIG. 1 of the drawings, the composite material of the present invention consists of a selected percentage by volume of randomly oriented metallic fibers 12 uniformly distributed in an interlaced pattern throughout a non-metallic matrix 14 preferably formed of a thermosetting plastic such as an epoxy resin. A readily available example of such resin is a liquid aromatic epoxy manufactured by the Shell Chemical Corp. and known as "Epon 828" in which "diepoxide 0" is the predominant constituent (the "0" indicating the absence of hydroxyls).

In order to permit curing of the epoxy resin at room temperature, an aromatic amine in liquid form is added thereto and thoroughly mixed therewith. A preferred example of such amine which is entirely compatible with the epoxy resin being utilized and which can be safely handled is the "Versamid 140" resin commercially developed by General Mills, Inc. When added to the "Epon 828" in a 40/60 ratio, this curing agent reacts therewith to provide a matrix material having high strength, outstanding impact and thermal shock resistance, excellent dimensional stability during the molding thereof into a desired configuration, extremely good adhesion to a variety of metals, a highly desirable exotherm capability, and a substantial resistance to attack by corrosive chemicals and solvents.

Fibers 12 are utilized as a reinforcing agent for matrix 14 and are preferably formed with a square or round cross-section ranging between .005″ and .015″ and a length ranging between .062″ and .125″. In order to provide maximum thermal conductivity, such fibers are preferably of either copper or aluminum and are individually identical in both cross-section and length. For best results, the copper should be of the highest commercially available quality (at least of 99.95% purity with no more than .04% oxygen). The aluminum fibers must also be of the highest purity to avoid the corrosive action of the amine in the matrix and consequently should be fabricated from the best commercially available grade which is 99.99% pure.

In certain instances, as will be explained hereinafter, the thermal conductivity of the composite material can be appreciably increased by adding from 20% to 25% by volume of titanium powder having an average particle size of 7.6 microns (99.2% of the fibers being of 325 mesh). While maximum purity is desired, up to 3% of incidental impurities can be tolerated.

As best shown in FIG. 2, the casting of the composite material to the configuration of the bearing pad of FIG. 1 is preferably accomplished by apparatus in which a rigid hollow mold 16 containing the desired interior contour is provided with an upwardly extending cylindrical overflow reservoir 18 arranged to hold the maximum amount of fibers 12 which may be required. Mold 16 is movably seated on a suitable platform 20 and is arranged to be temporarily positioned (step 1) beneath a hopper 22 which is, in turn, fixedly retained in a suitable support 24. Fibers 12 are poured into hopper 22 in an amount which will constitute about 20% by volume of the completed casting and fall into the interior of mold 16 to accumulate therein in randomly oriented, loosely packed, interlaced fashion. A lesser concentration of fibers 12 would be physically displaced by the subsequent flow of the resin mixture through the spaces therebetween and consequently will not provide the desired uniform distribution therein.

In the event a larger percentage of fiber volume, up to 40%, is desired, this can be achieved by increasing the quantity of fibers 12 poured into hopper 22 so that a portion of reservoir 18 will also be filled. Thereafter, fibers 12 can be lightly tamped down to the top of the interior contour of mold 16 (step 1a) to increase the compactness of the packing thereof. Such tamping can be conveniently accomplished by a suitable fixture 26 mounted on support 24 and provided with a pivoted handle 28 to which one end of a plunger 30 is centrally pivoted. When handle 28 is pulled downwardly, plunger 30 is forced thereby into reservoir 18 into tamping contact with fibers 12 therein.

Once fibers 12 are packed to the extent desired, mold 16 is advanced to a resin adding position (step 2) in alignment with an opening 32 in platform 20 and a funnel-shaped container 34 in support 24. The required thermosetting resin, in liquid form, is poured into container 34 to flow into the mold 16 and cover fibers 12 therein. In order to control the viscosity of the resin mixture, suitable heating coils 36 are arranged to surround the exterior of mold 16. As best shown in FIG. 5, the bottom of mold 16 is provided with a central passage 38 in communication with one end of a length of tubing 40 which extends downwardly therefrom into a vessel 42 to terminate in spaced relation to the floor thereof. Vessel 42 is seated on a suitable table 44 and is provided with a stopper or closure member 46 which also serves to support tubing 40. A vacuum pump 48 is mounted on table 44 and is connected to vessel 42 at a point slightly below closure member 46 therein.

Operation of pump 48 initially evacuates the air from vessel 42 and thereafter draws the liquified resin mixture down through the spaces between fibers 12 without disturbing the orientation or distribution thereof to any significant extent. The lower portion of vessel 42 is transparent in order to permit observation of the lower end of tubing 40 and when the resin mixture is seen to exit therefrom, the operation of pump 48 is shut down. The resin mixture will then begin to solidify and, if desired, such solidification may be accelerated by a suitable increase in the temperature of the heating coils 36.

In the event an even greater degree of thermal conductivity is desired in the composite material, it has been found that this can be achieved by increasing the volume percentage of fibers 12 up to a maximum of 70%. However, in such case, the greater compaction required of fibers 12 in mold 16 calls for the application of pressures as high as 300 lbs./sq. inch following the addition of the thermosetting resin mixture thereto. As best shown in FIG. 4, this is achieved by repositioning support 24 to permit a ram 50 to be brought into vertical alignment with mold 16. As ram 50 is actuated by the pressure applied thereto (step 3), the heated mixture of fibers 12 and resin in reservoir 18 is forced downwardly into the contoured interior of mold 16. At the same time, a portion of the resin mixture is forced past fibers 12 out through the bottom of mold 16 and into tubing 40 in vessel 42. However, the extent to which such increase in fiber compaction can be obtained is limited to the 70% volume ratio since the pressure required to achieve a greater concentration will cause fibers 12 to be extruded along with the resin mixture from the interior of mold 16.

Figure 6:
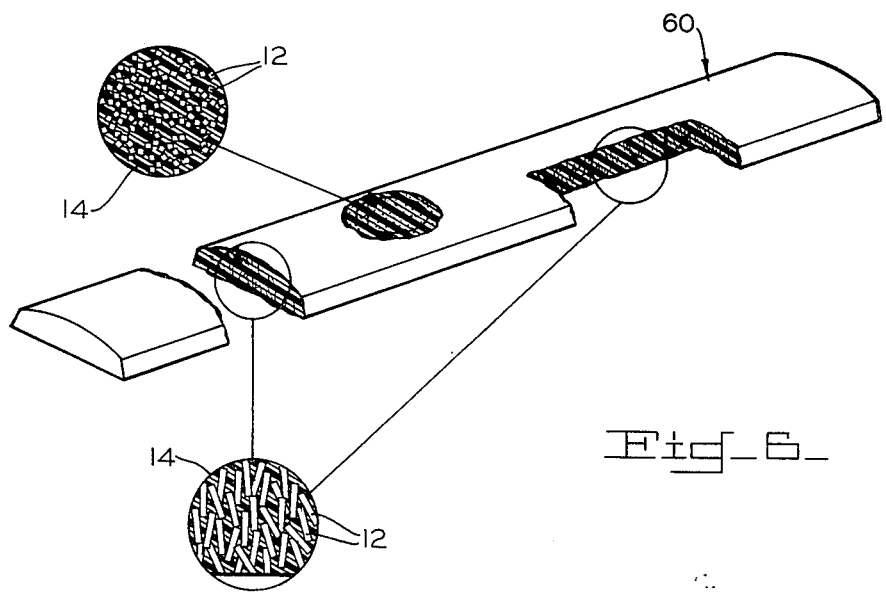
FIG. 6 is a perspective view similar to that of FIG. 1 but showing the orientation of the fibers in the matrix when the composite material is fabricated to be thermally conductive in an anistropic fashion.

As the volume percentage of fibers 12 in the matrix is increased, a correspondingly greater flow path is created for the passage of heat. It is, therefore, possible to tailor such composite material to provide a predetermined thermal conductivity by controlling the various factors which determine the fiber to matrix volume ratio. Where fibers 12 are of aluminum, the pressure applied thereto by ram 50 causes a majority of such fibers to bend about the individual contact points therebetween. The resulting increase in the surface contact area between individual fibers 12 provides a correspondingly greater path for the passage of heat therethrough. However, where the same fibers 12 are of copper, the greater stiffness of this metal limits the bending thereof to a considerably lesser extent than the aluminum. As a result, the copper fibers respond to the pressure applied thereto by ram 50 by undergoing an actual physical reorientation in a direction at right angles to the applied load thereby providing a heat conductivity which is generally anisotropic in nature, as shown in FIG. 6. Such hot pressing of the contents of mold 16 is a relatively simple and economical method for orienting metal fibers of a given size and shape in a thermosetting material especially where such as fibers are essentially non-magnetic and therefore cannot be aligned by magnetic procedures.

Another factor which must be taken into consideration in providing a composite material of this invention with a predetermined thermal conductivity is the necessity for a uniform cross-section and length for fibers 12. In the event the individual fibers vary in size and shape, there will be greater concentrations of metal in some portions of the interior of the mold than in other portions thereof thereby producing undesirable hot spots even though the distribution of fibers 12 in the matrix 14 is substantially uniform. It has been found that optimum results are achieved with fibers between .005 and .015 inch in cross-section, either square or round, and between .062 and .125 inch in length. If the geometries of the fibers 12 are below these minimums, they do not possess sufficient mass to withstand the forces imparted thereto by the flow of the resin mixture therethrough and consequently will not provide the required uniform distribution thereof. If the geometries of fibers 12 are in excess of the maximum limits, the weight thereof will cause settling in mold 16 and thereby prevent the attainment of the relatively loose packing required to permit the desired free flow of the resin mixture.

Another control factor involved in providing the composite material with a predetermined thermal conductivity is the conductivity of the matrix material itself. This may be significantly improved by the addition of a specified quantity of metal powder such as titanium, for example, to the resin mixture. Where the geometries and volume percentages of fibers 12 are at the lower portions of the given ranges, the titanium powder may be added in amounts between 20% and 25% by volume. Above these percentages, difficulty has been encountered in achieving the desired uniform dispersion of the titanium powder throughout the resin mixture. On the other hand, where the fiber variables are in the upper portions of the given ranges, no more than 20% of titanium powder should be added, otherwise the viscosity of the resin mixture would be increased to such extent as to interfere with the required flow thereof through fibers 12. In the event the composite material is required to possess greater lubricity, this may be achieved by substituting molybdenum disulphide powder for all or a portion of the titanium powder.

A highly desirable and important extra benefit stemming from the uniform distribution of discontinuous metallic fibers of identical geometry in a non-metallic matrix is the "exotherm" property thereof which may be defined as "the increase in temperature produced in a thermosetting material, such as an epoxy resin, by the energies released from the chemical reactions which take place during the curing thereof." When casting relatively large masses, the exterior surfaces thereof are cooled by the surrounding environment to provide a temperature differential which drives the heat generated within the inner regions of the casting to the outer regions thereof. If this heat cannot be rapidly dissipated from the casting during the curing process occurring during the solidification thereof, the material will gas and char thereby incurring the formation of cracks and flaws. However, the presence of metallic fibers in the thermosetting resin mixture serves as a conduit for the passage of the heat generated in the inner regions of relatively large castings and thereby minimizes the formation of cracks and flaws therein.

Composite materials with the desirable properties described herein are especially useful in those instances in which relatively large surface areas are in slidable and rotatable engagement. Under these conditions, it is essential that the mating surfaces possess a relatively low coefficient of friction and a high degree of lubricity and thermal conductivity. Since this combination of properties is generally not found in metal-to-metal contacts, one of the contact surfaces is customarily provided with bearing inserts of a material which will furnish the required low coefficient of friction and yet possess the wear resistance and toughness required to withstand the relatively high pressures and loads frequently encountered in high speed machining. While these characteristics are generally available in bearings of such organic plastics as nylon and Teflon, these materials are not sufficiently heat conductive to provide satisfactory endurance life in those environments where considerable frictional energy is generated for relatively long periods of time.

A particular example of the difficulties encountered in providing adequate bearing materials in high speed machining operations is found in the drilling of deep holes in elongated workpieces such as gun tubes. In this type of machining operation, the enlargement of the bore in a gun tube 52 is accomplished by a boring head 54 provided with suitable cutters 56 at the forward end thereof, as best shown in FIG. 3, and a hollow interior 58 for the passage of the cutting oil. In the guns of the largest calibers, the extreme lengths of tubes 52 require unusually long and strong boring heads 54 which are quite difficult to support with sufficient rigidity to prevent high frequency vibratory movement during high speed boring. Consequently, these boring heads 54 are generally provided with a plurality of bearing pads 60 symmetrically spaced about the exterior periphery thereof and dimensioned to project outwardly therefrom to substantially the same extent as cutters 56. Since the extent of the support provided by pads 60 is dependent on the surface area in contact with the interior bore surface of gun tube 52, it is apparent that considerable frictional heat will be generated during the traverse therethrough of boring head 54. Accordingly, the material utilized for bearing pads 60 must possess a high degree of thermal conductivity and in some instances must be able to dissipate the generated heat along the path of least resistance which, as shown in FIG. 3, is through the thickness of the pad 60 and toward the hollow interior 58 of boring head 54.

Such a highly desirable bearing material is even more attractive when the thermal conductivity thereof can be specifically tailored to approximate that of the surrounding environment. This will permit an extremely rapid dissipation of the frictional heat generated by the contact of bearing pads 60 with the interior bore surface of gun tube 52 and avoid any appreciable accumulation of heat in the pads themselves. Even more desirable results can be attained when bearing pads 60 are fabricated from a composite material designed to provide greater thermal conductivity in one direction than in directions at right angles thereto especially where the thickness of material in the one direction is limited to substantially the same dimension as the length of the individual fibers. If such direction is transverse to the longitudinal axis of bearing pad 60, the flow of the relatively cooler cutting oil through the hollow interior 58 of boring head 54 will create a heat sink through the lesser thickness of material beneath pad 60 than the much thicker gun tube material on the opposite side thereof.

While the formulation of the composite bearing material of the present invention provides a large variety of compositions which can be advantageously utilized in the deep boring of large caliber gun tubes, the optimum combination of maximum thermal conductivity and minimum density is provided by the use of a 40% volume of aluminum fibers with a square or round cross-section of .005 inch and a length of 0.125 inch randomly oriented and uniformly distributed throughout a matrix consisting of a 28.8% Epon 828, 12% Versamid 140, and 19.2% of titanium powder. Such formulation provides a heat conductivity of 12.05 measured in watts per meter per degree centigrade and a density of 2.15 gm./cm.$^3$ which is only slightly less than the similarly expressed 13.8 conductivity of stainless steel and yet is only one quarter thereof in density. Obviously, this is an extremely desirable combination of properties for a bearing material which also provides a low coefficient of friction, good resistance to wear, good load capacity, and an excellent resistance to corrosion.

The following table discloses a selected number of composite material formulations which can be used to determine the effects of the variables to which the fibers and the thermosetting resin mixture are subjected. The materials listed in the table are each expressed as a percentage of the total volume of the resulting composite. K is the conductivity measured in watts per meter per degree of centigrade.

| Sample | Titanium powder, percent | Epon 828, percent | Versamid 140, percent | Fibers, percent | Density, gm./cm.$^3$ | K |
|---|---|---|---|---|---|---|
| A | | 46.8 | 31.2 | $^1$ 22 | 2.76 | 2.63 |
| B | 24.96 | 37.44 | 15.6 | $^1$ 22 | 3.23 | 4.53 |
| C | 19.20 | 28.8 | 12.0 | $^1$ 40 | 4.78 | 10.05 |
| D | | 46.8 | 31.2 | $^2$ 22 | 1.46 | 2.13 |
| E | | 36.0 | 24.0 | $^2$ 40 | 1.72 | 4.53 |
| F | 19.20 | 28.8 | 12.0 | $^2$ 40 | 2.15 | 12.05 |

$^1$ Copper fibers 0.005″ x 0.005″ x 0.062″.
$^2$ Aluminum fibers 0.005″ x 0.005″ x 0.125″.

As can readily be seen from the foregoing table, the composite materials with a 40% volume percentage of fibers display the best thermal conductivity. These are the formulations in which hot pressing is utilized to reach the required fiber volume percentage in the completed vacuum casting. In the comparable composites in which the fiber volume is 22%, the use of the more conductive copper fibers provides a greater thermal conductivity than the aluminum fibers, all other factors being the same. However, where the fiber volume is 40%, the less conductive aluminum fibers provide greater thermal conductivity inasmuch as the random orientation thereof in the matrix is not significantly altered in response to the hot pressing step of the fabrication process, as previously explained. On the other hand, where the density of the finished composite is not a critical factor, the addition to the resin mixture of a 25% volume of titanium powder will provide the same high degree of thermal conductivity as the hot pressed composite containing a 40% fiber volume without the necessity for the hot pressing procedure.

Thus, the composite material of the present invention displays a far greater thermal conductivity than the best of the fiber-reinforced non-metallic formulations heretofore utilized for bearing applications. These superior results are primarily due to the fact that the fibers are not only uniformly distributed throughout the matrix material but are also individually identical in size and shape.

Although the present invention is explained in accordance with the preferred embodiments shown and described herein, it will also become obvious to persons skilled in the art that other forms thereof, as well as changes in the particular forms described, are possible within the spirit and scope of the present invention. Therefore, it is desired that the present invention shall not be limited except insofar as it is made necessary by the prior art and by the spirit of the appended claims.

I claim:
1. A bearing of composite material comprising, a matrix of an epoxy resin and an amine curing agent combined in a 60/40 ratio, and a plurality of randomly oriented, metal fibers individually identical in both cross-section and length and embedded in said matrix in a pattern designed to provide the same degree of thermal conductivity uniformly throughout the bearing, said fibers being limited to between .005 inch and .015 inch in cross-section and between .062 inch and .125 inch in length.

2. A composite bearing material comprising, a matrix formed of about 28.8% by volume of a thermosetting epoxy resin, about 12% by volume of an amine curing agent, and about 19.2% by volume of titanium powder, and a plurality of individually identical aluminum fibers having a square cross-section of approximately .005″ and a length of approximately .125″ and being uniformly distributed throughout said matrix in random orientation to constitute about 40% of the total volume of the composite material and thereby produce an end product having an isotropic thermal conductivity substantially equivalent to that of stainless steel but with only one-quarter of the density thereof.

3. A composite bearing material comprising, a matrix formed of about 28.8% by volume of a thermosetting epoxy resin, about 12% by volume of an amine curing agent, and about 19.2% by volume of titanium powder, and a plurality of individually identical copper fibers having a square cross-section of approximately .005″ and a length of approximately .125″ and being uniformly distributed throughout said matrix in generally parallel orientation to constitute about 40% of the total volume of the composite material and thereby produce an end product having a predetermined degree of anisotropic thermal conductivity in the direction of the long axis of the fibers.

References Cited
UNITED STATES PATENTS

| | | | |
|---|---|---|---|
| 2,774,747 | 12/1956 | Wolfson et al. | 260—37 Ep |
| 2,901,455 | 8/1959 | Jurras | 260—37 Ep |
| 3,007,890 | 11/1961 | Twiss et al. | 260—37 Ep |
| 3,041,131 | 6/1962 | Juras et al. | 161—170 |
| 3,291,758 | 12/1966 | Treaftis | 260—37 Ep |
| 3,429,981 | 2/1969 | Shallahamer et al. | 260—37 Ep |

MORRIS SUSSMAN, Primary Examiner

U.S. Cl. X.R.

260—37 Ep; 308—6 R, Dig. 8